United States Patent [19]
Malen et al.

[11] Patent Number: 5,308,285
[45] Date of Patent: May 3, 1994

[54] METHOD OF MAKING A BOLT AND WASHER ASSEMBLY

[75] Inventors: Gerald Malen, Troy; William Deason, Mt. Clemens; Joseph Muschella, Troy, all of Mich.

[73] Assignee: The Cold Heading Company, Detroit, Mich.

[21] Appl. No.: 829,496

[22] Filed: Feb. 3, 1992

[51] Int. Cl.$^5$ ............... B21H 3/02; F16B 43/00; B21D 53/20
[52] U.S. Cl. ...................... 470/4; 411/368; 411/533
[58] Field of Search ............... 411/368, 369, 370, 533; 470/3, 4, 49, 50

[56] References Cited

U.S. PATENT DOCUMENTS

| | | |
|---|---|---|
| 1,262,975 | 4/1918 | Pierce . |
| 1,868,415 | 7/1932 | Gundersen et al. . |
| 2,192,322 | 3/1940 | Mitchell .................. 470/4 |
| 2,283,494 | 5/1942 | Erdman .................. 470/4 |
| 2,303,224 | 11/1942 | Olson .................. 470/4 |
| 2,792,578 | 5/1957 | Autio . |
| 2,914,780 | 12/1959 | Poupitch . |
| 3,687,184 | 8/1972 | Wagner . |
| 3,837,212 | 9/1974 | Gutshall . |
| 3,862,458 | 1/1975 | Stanaitis .................. 470/4 |
| 3,981,170 | 9/1976 | Barth et al. .................. 470/4 X |

Primary Examiner—Neill R. Wilson
Attorney, Agent, or Firm—Remy J. VanOphem

[57] ABSTRACT

A method for fabricating a fastener and washer assembly wherein the washer is permanently retained on the fastener by an annular raised portion on the shank of the fastener. The annular raised portion and the inner diameter of the washer are mutually formed so as to promote elastic deformation of both the raised portion and the washer when the washer is forced over the raised portion to be retained on the fastener. The method allows the fastener and the washer to be fully fabricated and processed prior to assembly, including such desirable steps as heat treating and plating of both the fastener and the washer. The annular raised portion is formed by a pair of converging annular surfaces which define a predetermined diameter. The washer has an inner diameter surface having a pair of chamfered edges. The washer is assembled onto the shank of the fastener by forcing the chamfered edge of the washer against and past the annular raised portion. the inner diameter is sized relative to the diameter of the annular raised portion such that it is elastically, and not plastically, expanded while the annular raised portion is elastically compressed as the washer is forced over the annular raised portion. Thereafter, both the washer and the annular raised portion elastically revert back to their respective diameters. The washer is permanently retained on the fastener by the raised portion to form the fastener and washer assembly.

7 Claims, 1 Drawing Sheet

METHOD OF MAKING A BOLT AND WASHER ASSEMBLY

BACKGROUND OF THE INVENTION

1. Field of the Invention

The present invention generally relates to fastener and washer assemblies used as securing or fastening devices. More specifically, this invention relates to a fastener and washer assembly in which the washer is permanently retained on the shank of the bolt by a raised periphery, wherein the raised periphery is formed on the shank of the fastener prior to installing the washer and wherein the washer is provided with a lead chamfer on its internal diameter which enables the washer to be elastically forced over the raised periphery of the fastener so as to be permanently retained thereby.

2. Description of the Prior Art

Pre-assembled fastener and washer assemblies have gained wide acceptance in manufacturing because of the convenience and efficiency they offer, providing the manufacturer with savings in both assembly time and costs. The fastener can be either a screw or a bolt which is intended to receive a nut. Fastener and washer assemblies are commonly available in many sizes to accommodate applications ranging from electronics to automobile assemblies. Such applications generally demand a clamping capability which can be maintained in an environment which includes vibration and temperature variations that tend to fatigue or otherwise decrease the fastener's ability to sustain the desired clamping load. Accordingly, the fastener and washer must each possess specific material characteristics suitable for the particular application and its environment. However, the material characteristics of the fastener and washer, such as strength, stiffness, and heat and surface treatments, are ultimately dependent upon the method used to manufacture the assembly. Consequently, the processing techniques used to form the fastener and washer and assemble them together can be critical.

Where material characteristics, particularly surface and heat treatments, of the fastener and washer are not critical, the washer can be assembled to the fastener prior to the final processing steps of the fastener. Such an approach is taught in U.S. Pat. Nos. 2,303,224 to Olson; 2,792,578 to Autio; 2,914,780 to Poupitch; 3,862,458 to Stanaitis; and 3,837,212 to Gutshall. Olson teaches assembling the washer to the fastener, and thereafter retaining the washer on the fastener by forming a raised knurled rib on the perimeter of the fastener's shank to trap the washer between the fastener head and the knurled rib. Similarly, Autio teaches forming intermittent protuberances on the perimeter of the fastener's shank after the washer has been assembled to the fastener, while both Stanaitis and Gutshall form a flange on the fastener's shank for retaining a previously assembled washer.

In contrast, Poupitch teaches actually forming the fastener after the washer is in place such that the washer is retained against the fastener head by a protrusion on the shank's perimeter. Further variations of this approach are illustrated by U.S. Pat. Nos. 1,262,975 to Pierce and 1,868,415 to Gundersen et al. Pierce actually welds the shank of the fastener to the fastener head in a manner which rigidly secures a washer to the fastener. Annular reliefs formed along the inner diameter of the washer receive molten metal from the shank and fastener head during welding to positively retain the washer. Gundersen et al initially forms the washer as an integral part of the fastener, and thereafter shears the washer from the shank of the fastener in a manner that produces a tapered inner diameter to the washer. The threads of the fastener are formed so as to be greater in diameter than the inner diameter of the washer to positively retain the washer to the fastener.

A disadvantage to all of the above approaches is that the material characteristics of the fastener and washer are severely limited in that the final processing steps occur after the washer is secured to the fastener. In particular, any heat treating or surface treatments desired after the final forming steps must be carried out on both the fastener and washer, whether to do so is desirable or not. The alternative is to forego any subsequent heat treating or surface treatment. However, this is highly undesirable under many circumstances, particularly where improved material characteristics would allow the use of smaller fasteners which provide for substantial weight and space savings. In addition, surface and heat treatments are desirable where the environment is particularly corrosive or is subject to temperature extremes.

Accordingly, forming the fastener and washer during entirely different steps and from different materials allows greater versatility in the material qualities and uses of the fastener and washer assembly. For instance, the fastener can be formed to have optimal strength while forming the washer from a more resilient material. Further, the fastener and washer can separately undergo heat and surface treatments particularly suited for the materials used and the intended environment.

One solution for achieving this advantage is to retain the washer on the fastener with a third member, such as a collar. This type of approach is illustrated in U.S. Pat. No. 3,687,184 to Wagner. Wagner teaches the use of a retainer member having an annular shoulder which is slightly greater than the inner diameter of the washer. The washer is first assembled to the retainer member, being forced over the annular shoulder so as to retain the washer directly to the retainer member. The retainer member is then assembled to the fastener, being retained on the fastener with a slight interference between the inner diameter of the retainer member and the fastener threads. However, a clear disadvantage with the teachings of Wagner is the need for an additional member, incurring additional part costs and assembly time. Another possible disadvantage is the potential adverse effects on the clamping capability of the fastener and washer assembly.

As an alternative, U.S. Pat. No. 2,283,494 to Erdman teaches the preforming of an annular shoulder on the shank of a fastener prior to assembling the washer. The washer is described as being forced over the annular shoulder so as to be permanently retained thereby. In practice, this approach requires that the tolerances between the diameter of the washer and the shoulder must be closely held to allow the washer to be forced over the shoulder without significantly deforming the washer. Such tight tolerances are undesirable, as they are expensive and difficult to maintain in a mass-produced item such as a fastener and washer. It is a likely tendency that the pressing procedure necessary to force the washer onto the fastener requires a substantial force, resulting in the inner diameter of the washer being deformed. Such a result is even more likely where the fastener or the washer has been hardened through a heat treatment or surface treatment process. A supplemental approach to diminishing the likelihood of permanent deformation to the washer is to limit the washer material to a spring steel, and further to limit the thickness of the washer to enhance its resiliency. However, any attempt to facilitate assembly by altering the material characteristics severely limits the choice in materials, limiting the types of applications for which the fastener and washer assembly are suitable.

From the above discussion, it can be readily appreciated that the prior art does not disclose a fastener and washer assembly which possesses the advantages of allowing the fastener and washer to be independently processed prior to assembling, while also facilitating assembly such that additional members and undersirably tight tolerances are avoided. Nor does the prior art teach or suggest such a fastener and washer assembly which avoids the requirement of excessive assembly forces which have the tendency to damage and otherwise deform the members of the assembly.

Accordingly, what is needed is a method of producing a fastener and washer assembly which allows the fastener and washer to be formed and processed independent of each other, yet provides that the fastener and washer are formed such that they can be readily assembled together inexpensively even after such processing as heat and surface treatments. As an advantageous result, the fastener and washer can be manufactured and assembled with conventional tolerances, which facilitate mass production.

SUMMARY OF THE INVENTION

According to the present invention there is provided a method for fabricating a fastener and washer assembly wherein the washer is permanently retained on the fastener with a raised portion on the shank of the fastener. The raised portion and the inner diameter of the washer are mutually formed so as to promote elastic deformation of both the raised portion and the washer when the washer is forced over the raised portion to be retained on the fastener. The method allows the fastener and the washer to be fully fabricated and processed prior to assembly, including such desirable steps as heat treating and plating of both the fastener and the washer.

The method of the present invention includes independently forming both the fastener and the washer. A shank is formed on the fastener so as to have the preferred diameter for a particular application. In turn, the washer is formed as an apertured disc having a pair of oppositely disposed axial end surfaces and an inner diameter surface which defines the inner diameter of the washer. The inner diameter of the washer is sufficiently greater than the diameter of the shank to allow the washer to be freely slidable thereon. The inner diameter surface of the washer also defines a chamfered edge with at least one of the axial end surfaces. After forming, the washer can undergo any heat or surface treatment desired for the particular application.

A raised portion is formed on the shank of the fastener to extend radially outward from the diameter of the shank, defining a predetermined diameter which is greater than the diameter of the shank but only slightly greater than the inner diameter of the washer. The fastener can thereafter be further processed, including any desired heat or surface treatment. The washer is then assembled onto the shank of the fastener by first abutting the chamfered edge of the washer against the raised portion on the shank, and then forcing the washer over the raised portion until it is retained on the fastener between the raised portion and the head of the fastener.

In conjunction with the chamfered edge, the inner diameter is sized relative to the diameter of the raised portion of the shank such that there is a predetermined interference fit therebetween. The interference fit is selected to avoid plastic deformation of the fastener and washer such that elastic expansion of the inner diameter of the washer and elastic compression of the raised portion occurs as the washer is forced past the raised portion. Both the washer and the raised portion elastically revert back to their respective diameters once the washer is forced past the raised portion. Thereafter, the washer is permanently retained on the fastener by the raised portion to form the fastener and washer assembly.

The head of the fastener serves as an abutment surface for the washer, while the opposite end of the fastener can be threaded for threadably engaging a nut or a suitably prepared bore. Alternatively, any form of fastening feature can be provided on the fastener in place of the threaded portion. The shank of the fastener is defined as being that portion of the fastener between the threaded portion and the fastener head. The raised portion is formed on the shank in axially-spaced relationship to the fastener head and the threaded portion. After assembly, the washer is slidably disposed on the shank between the fastener head and the raised portion until the fastener and washer assembly is employed to clamp or otherwise fasten two or more members together.

To achieve the elastic deformation sought by the present invention, the raised portion on the fastener's shank is preferably formed with at least one radially-oriented annular surface which terminates at its radially outward perimeter to define a predetermined diameter. The annular surface is disposed to face the threaded portion of the fastener, inclining toward the head of the fastener. The angle of inclination, relative to the longitudinal axis of the fastener, of the annular surface preferably matches that of the chamfered edge on the washer. Accordingly, a surface-to-surface contact between the chamfered edge of the washer and the annular surface distributes the assembly forces between the annular surface and the chamfered edge, inhibiting localized plastic deformation of either the washer or the raised portion.

According to a preferred aspect of this invention, the interaction between the chamfered edge of the washer and the annular surface on the fastener during assembly of the washer to the fastener causes the inner diameter of the washer and the raised portion on the fastener, respectively, to elastically deform sufficiently to allow the washer to pass over the raised portion. Thereafter, both the inner diameter of the washer and the raised portion of the fastener return to their respective pre-assembly dimensions. No plastic deformation occurs by which the material or clamping characteristics of the fastener and washer are detrimentally affected.

In addition, a significant advantage of the present invention is that the available choices in fastener and washer material are increased as a result of the elastic deformation which occurs between the washer and the raised portion. Also, greater allowable axial thickness of the washer, along with additional heat and surface treatments for both the fastener and washer, can be provided to an extent not possible with the prior art.

Accordingly, it is an object of the present invention to provide a method for assembling a fastener and washer to form a fastener and washer assembly in which the washer is permanently retained on the fastener.

It is a further object of the invention that the method provide a feature for retaining the washer on the fastener which does not prohibit any heat treating or surface treatments which may be desirable for a particular application.

It is still a further object of the invention that the method employ a raised portion formed on the shank of the fastener which is greater in diameter than the inner diameter of the mating washer to be assembled.

It is another object of the invention that the leading edge of the washer's inner diameter be chamfered to facilitate the ability of the washer to be forced over the raised portion to be retained thereby on the fastener.

It is yet another object of the invention that the raised portion be formed with at least one inclined radial annular surface which engages the chamfered edge of the washer as the washer is assembled to the fastener to facilitate assembly of the washer onto the fastener.

It is still another object of the invention that the difference between the outer diameter of the raised portion and the inner diameter of the washer be such that each are elastically deformed as the washer is forced over the raised portion, whereby both the washer and the raised portion immediately return to their respective original diameters once the washer is assembled to the fastener.

Other objects and advantages of this invention will be more apparent after a reading of the following detailed description taken in conjunction with the drawings provided.

DETAILED DESCRIPTION OF THE PREFERRED EMBODIMENT

Figure 1:
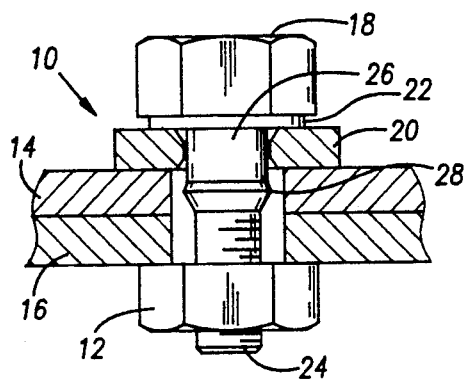
FIG. 1 is a partial cross sectional side view of a fastener and washer assembly as used to clamp a pair of plates together in accordance with the preferred embodiment of this invention.

With reference to FIG. 1, there is shown a fastener and washer assembly 10 in accordance with the present invention which has been further assembled with a nut 12 to clamp a pair of plates 14 and 16 together. The fastener and washer assembly 10 includes a fastener 18, such as the bolt shown, and a washer 20. Though illustrated as a bolt, the features of the present invention can be used with a screw which is not used with a nut but is directly threadably engagable with a suitably prepared bore. The fastener 18 is formed with a head 22, an externally threaded portion 24, and a shank 26 therebetween.

Figure 3:
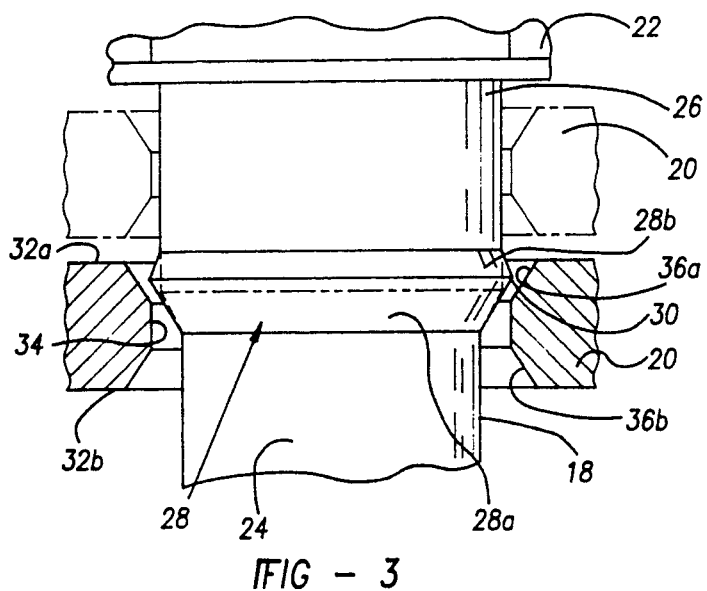
FIG. 3 is a side view of the fastener of FIG. 1 subsequent to the swaging of an annular raised portion on the shank of the fastener, and illustrating pre- and post-assembly positions of the washer in accordance with the preferred embodiment of this invention.

As can be best seen in FIG. 3, there is a annular raised portion 28 on the fastener 18 which is spaced apart from the head 22 of the fastener 18 and located adjacent the threads of the externally threaded portion 24. The annular raised portion 28 need only be spaced from the head 22 of the fastener 18 to accommodate the axial thickness of the washer 20. The annular raised portion 28 is defined by two converging annular surfaces 28a and 28b which intersect to define a radially outward perimeter 30. The perimeter 30 defines a predetermined diameter for a purpose to be explained below. The first annular surface 28a is disposed to face the threaded portion 24 of the fastener 18, inclining toward the head 22 of the fastener 18. The second annular surface 28b is disposed to face the head 22 of the fastener 18, inclining toward the threaded portion 24.

Both the first and second annular surfaces 28a and 28b have a predetermined angle of inclination with respect to the longitudinal axis of the fastener 18. The second annular surface 28b extends a longitudinal distance shorter than that of the first annular surface 28a due to a difference in diameters between the shank 26 and the threaded portion 24 of the fastener 18. The shank 26 has a greater diameter than that of the threaded portion 24. As a result, the second annular surface 28b intersects the corresponding diameter of the shank 26 at a longitudinally displaced distance from the radially outward perimeter 30 of the annular raised portion 28 which is less than the longitudinally displaced distance between the radially outward perimeter 30 and the point of intersection between the first annular surface 28a and its surrounding diameter defined by the threaded portion 24.

The washer 20 has a pair of oppositely disposed axial ends defined by surfaces 32a and 32b and an inner diameter surface 34 which defines an inner diameter of the washer 20. The inner diameter surface 34, together with the pair of axial ends 32a and 32b, define a pair of edges 36a and 36b. As can be seen in FIG. 3, each of the pair of edges 36a and 36b are chamfered. The chamfer angle is selected to be substantially equal to the angle of inclination of the two converging annular surfaces 28a and 28b. In practice, an angle of inclination of 30 degrees on both the chamfered edges 36a and 36b and the two converging annular surfaces 28a and 28b has been found to perform satisfactorily. Accordingly, during the initial stage of assembly, a surface-to-surface contact results between the first annular surface 28a and the first chamfered edge 36a to be installed over the fastener 18, as illustrated in FIG. 3. The surface-to-surface contact generally promotes distribution of the assembly forces between the first annular surface 28a and the first chamfered edge 36a, inhibiting localized plastic deformation of either the washer 20 or the annular raised portion 28.

Figure 4:
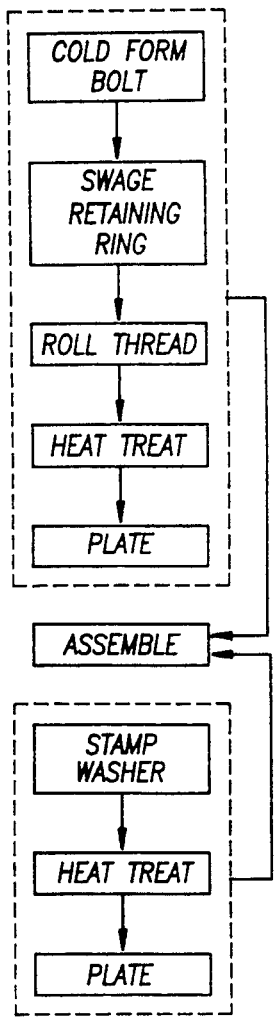
FIG. 4 represents a preferred processing procedure for manufacturing and assembling the fastener and washer assembly of the present invention.

The method for forming a fastener and washer assembly 10 according to the present invention is generally depicted in FIG. 4 to include the following steps.

Figure 2:
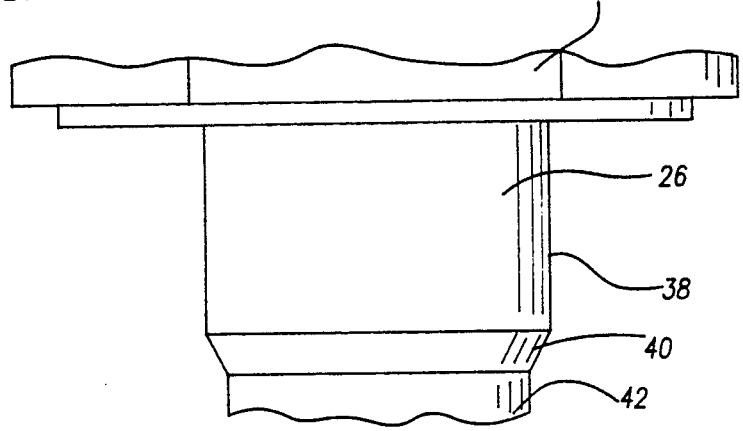
FIG. 2 is a side view of the fastener of FIG. 1 prior to swaging an annular raised portion on the shank of the fastener in accordance with the preferred embodiment of this invention.

First, both the fastener 18 and the washer 20 are individually formed using any preferable method known to the art. As an example, the fastener 18 can be cold formed while the washer 20 is formed in a stamping process. During the forming process of the fastener 18, the shank 26 of the fastener 18 is formed with a cylindrical surface 38 having a pre-swaging diameter, as seen in FIG. 2. The diametral transition between the shank 26 and a blank 42 upon which the threaded portion 24 will be subsequently formed defines a swaged inclined surface 40 having a predetermined angle of inclination.

The axial end surfaces 32a and 32b and inner diameter surface 34 of the washer 20 are formed during the forming process. The diameter of the inner diameter surface 34 is sized according to any post-forming treatment planned for the washer 20. For example, a heat treatment or surface treatment which results in the reduction of the inner diameter of the washer 20 will necessitate the inner diameter being initially formed oversized in order to result in a final inner diameter required for the preferred assembly method. In the example of FIG. 4, the heat treatment of the washer 20 may influence the final inner diameter of the washer 20, while the surface plating will most certainly have such an effect. The chamfered edges 36a and 36b are also formed at this time, also keeping in mind the effects of any post-forming treatment that may be desired.

Next, the annular raised portion 28 is formed on the shank 26 of the fastener 18 adjacent the blank portion 42 upon which the threads of the fastener 18 will be formed. With reference again to FIG. 3, the annular raised portion 28 is formed from the pre-swaged inclined surface 40, preferably by a swaging process which reduces the diameter of the fastener 18 along the length of the shank 26. The first annular raised surface 28a is formed so as to be an extension of the pre-swaged inclined surface 40. The swaging process also forms the second annular surface 28b, which, together with the first annular surface 28a, forms the radially outward perimeter 30 which defines the predetermined diameter of the annular raised portion 28. As noted above in the discussion pertaining to the washer 20, any subsequent heat or surface treatment of the fastener 18 will affect the final diameter of the annular raised portion 28, along with the diameter of the shank 26 and the threaded portion 24. Accordingly, accommodations must be made during the forming of the fastener 18 as well as in order to ensure that the post-treatment diameter of the radially outward perimeter 30 will define the predetermined diameter desired. The post-treatment predetermined diameter must be greater than the inner diameter of the washer 20, the diameter of the shank 26, and the diameter of the blank portion 42 upon which the threaded portion 24 is formed.

The relationship between the predetermined diameter of the annular raised portion 28 and the inner diameter of the washer 20 is the most critical. As an example, in one embodiment the present invention has proven successful where the predetermined diameter of the annular raised portion 28 is maintained between 0.465 and 0.455 inches, while the inner diameter of the washer 20 is maintained between 0.446 and 0.442 inches, producing a diametral interference of between 0.009 and 0.023 inches. As well known by those skilled in the art, the preferred diametral interferences may vary according to the respective materials of the fastener 18 and washer 20, the diameter of the shank 26 necessary for a particular application, and the heat and surface treatments used. Accordingly, the above values are for illustrative purposes only, and in no way limit the diameters or diametral interferences which may be utilized to achieve the objects of the present invention.

Threads are then formed on the blank portion 42 to form the threaded portion 24 of the fastener 18. The threads can be rolled, as indicated in FIG. 4, cut or otherwise formed as is well known in the art. The fastener 18 can then undergo any desired heat treatment or surface treatment, such as plating provided for in FIG. 4. As indicated above, the final diameter of the annular raised portion 28 will be affected by the heat and surface treatments chosen, and the pre-treatment diameter must be selected in accordance with this effect.

As the final step, the washer 20 is assembled onto the shank 26 of the fastener 18 by first abutting one of the chamfered edges 36a and 36b (36a as shown in FIG. 3) against the first annular surface 28a of the annular raised portion 28. The washer 20 is then further forced over the annular raised portion 28 such that the inner diameter of the washer 20 is elastically expanded while the annular raised portion 28 is elastically compressed. Due to the elastic deformation of both the washer 20 and the annular raised portion 28 as provided for by choosing a suitable interference fit, both the washer 20 and the annular raised portion 28 elastically revert back to their respective diameters once the washer 20 has been forced past the annular raised portion 28. The washer 20 is thereafter permanently retained on the shank 26 of the fastener 18 between the head 22 and annular raised portion 28 so as to form the fastener and washer assembly 10.

A significant advantage of the method of the present invention is that the fastener and washer assembly 10 can be assembled subsequent to any desired post-forming processing, such as a heat or surface treatment. The annular raised portion 28 does not prohibit any such post-forming treatment, which enables both the fastener 18 and the washer 20 to be independently processed according to the needs of a particular application. In addition, the method employs the annular raised portion 28 as a readily-formable feature for retaining the washer 20 on the fastener 18, avoiding any need for additional hardware.

Another significant advantage of the present invention is that, during assembly, the interaction between the first annular surface 28a and the chamfered edges 36a and 36b of the washer 20 causes both the annular raised portion 28 and the inner diameter of the washer 20 to elastically deform sufficiently to allow the washer 20 to pass over the annular raised portion 28. The difference between the predetermined diameter of the annular raised portion 28 and the inner diameter of the washer 20 are such that each is elastically deformed, and not plastically deformed, as the washer 20 is forced over the annular raised portion 28. As a preferred result, both the washer 20 and the annular raised portion 28 immediately return to their respective original diameters once the washer 20 is assembled to the fastener 18.

In addition, the options available for the thickness of the washer 20 and materials of both the washer 20 and the fastener 18 are increased as a result of the elastic deformation between the washer 20 and the annular raised portion 28 being promoted. Greater washer thicknesses, along with additional heat and surface treatments, can be provided for both the fastener 18 and washer 20 to an extent not possible with the prior art.

While the invention has been described in terms of a preferred embodiment, it is apparent that other forms could be adopted by one skilled in the art. Accordingly, the scope of the invention is to be limited only by the following claims.

What is claimed is:

1. A method for cold forming a fastener and washer assembly wherein said washer is permanently retained on a shank formed on said fastener, said method comprising the steps of:

forming a shank and a head on said fastener, said shank defining a shank diameter;

forming at least one axial end surface and an inner diameter surface on said washer, said inner diameter surface defining an inner diameter;

forming at least one chamfer between said at least one axial end surface of said washer and said inner diameter surface of said washer;

cold forming a raised portion on said shank, said raised portion having a predetermined diameter greater than said shank diameter, said raised portion having a first chamfer between said shank diameter and said predetermined diameter of said raised portion, said step of cold forming a raised portion on said shank further comprising the step of simultaneously cold forming a second surface located between said shank diameter and said predetermined diameter of said raised portion, said second surface having a diameter less than said predetermined diameter of said raised portion; and assembling said washer onto said shank of said fastener by first abutting said inner diameter surface of said washer against said first chamfer of said raised portion of said shank and thereafter forcing said inner diameter surface of said washer past said first chamfer of said raised portion of said shank such that said inner diameter surface of said washer is elastically expanded while said raised portion is elastically compressed, each said washer and said raised portion elastically reverting back to said inner diameter and said predetermined diameter, respectively, once said washer is forced past said raised portion, said washer being permanently retained on said fastener to form said fastener and washer assembly.

2. The method of claim 1 wherein said step of cold forming said raised portion is followed by the step of forming threads on said fastener.

3. The method of claim 1 wherein said step of cold forming said raised portion is followed by the step of heat treating said fastener.

4. The method of claim 1 wherein said step of cold forming said raised portion is followed by the step of plating said fastener.

5. The method of claim 1 wherein said step of cold forming said washer is followed by the step of heat treating said washer.

6. The method of claim 1 wherein said step of cold forming said washer is followed by the step of plating said washer.

7. A method for forming a fastener and washer assembly wherein said washer is permanently retained on a shank formed on said fastener, said method comprising the steps of:

forming both said fastener and said washer, said shank of said fastener defining a shank diameter, said washer being formed to have an axial end surface and an inner diameter surface, said inner diameter surface defining an inner diameter, said inner diameter surface defining a chamfered edge with said axial end surface;

forming a raised portion on said shank, said raised portion having a predetermined diameter greater than said shank diameter;

forming threads on said fastener;

heat treating both said fastener and said washer;

plating said fastener and said washer; and assembling said washer onto said shank of said fastener by first abutting said chamfered edge against said raised portion and thereafter forcing said chamfered edge past said raised portion such that said inner diameter surface of said washer is elastically expanded while said raised portion is elastically compressed, said washer and said raised portion each elastically reverting back to said inner diameter and said predetermined diameter, respectively, once said washer is forced past said raised portion, said washer being permanently retained on said fastener to form said fastener and washer assembly.

* * * * *